(12) United States Patent
Tashiro

(10) Patent No.: US 8,578,112 B2
(45) Date of Patent: Nov. 5, 2013

(54) DATA MANAGEMENT SYSTEM AND DATA MANAGEMENT METHOD

(75) Inventor: Naomitsu Tashiro, Oi (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 59 days.

(21) Appl. No.: 13/394,709

(22) PCT Filed: Feb. 23, 2012

(86) PCT No.: PCT/JP2012/001220
§ 371 (c)(1),
(2), (4) Date: Mar. 7, 2012

(87) PCT Pub. No.: WO2013/124896
PCT Pub. Date: Aug. 29, 2013

(65) Prior Publication Data
US 2013/0227237 A1    Aug. 29, 2013

(51) Int. Cl.
*G06F 12/00* (2006.01)
(52) U.S. Cl.
USPC ..... 711/162; 711/165; 711/170; 711/E12.009
(58) Field of Classification Search
None
See application file for complete search history.

(56) References Cited

U.S. PATENT DOCUMENTS 6,928,526 B1    8/2005    Zhu et al.
2010/0223441 A1    9/2010    Lillibridge et al.

FOREIGN PATENT DOCUMENTS

WO    WO 2011/159322    12/2011

OTHER PUBLICATIONS

Romanski, Bartlomiej, et al.; Anchor-Driven Sunbchunk Deduplication; SYSTOR '11, May 30-Jun. 1, 2011; Haifa, Israel; 13 pages.
Siebenmann, Chris; Why ZFS dedup is not something we can use; Oct. 29, 2011; 5 pages.
PCT International Search Report and Written Opinion on application PCT/JP2012/001220 mailed Aug. 21, 2012;10 pges.

*Primary Examiner* — Manorama Padmanabhan
*Assistant Examiner* — Baboucarr Faal
(74) *Attorney, Agent, or Firm* — Foley & Lardner LLP

(57) ABSTRACT

A data management system and data management method capable of inhibiting an increase of I/Os caused by deduplication are provided.
Data blocks are managed by grouping them; a plurality of chunks belonging to the same group after deduplication are collectively managed as a chunk data set; and if a host system issues a data block deletion request, garbage collection of the relevant chunk data set is performed based on the number of times of references of the chunk data set and the chunk data set after the garbage collection is managed by overwriting the existing chunk data set with a new chunk data set composed of only chunks of data blocks which are not deleted.

14 Claims, 15 Drawing Sheets

DATA MANAGEMENT SYSTEM AND DATA MANAGEMENT METHOD

TECHNICAL FIELD

The present invention relates to a data management system and a data management method and is particularly suited for use in a data management system and data management method for deleting duplicate data blocks by means of a deduplication technique.

BACKGROUND ART

Conventionally, the deduplication technique is used when data blocks (such as files) which are individually stored in a plurality of storage systems are to be managed by aggregating them in one large-capacity file storage system or when data blocks which are stored in one storage system are to be managed by, for example, periodically aggregating them as backups in one large-capacity storage system.

The deduplication technique is a technique used, when a plurality of pieces of data with duplicate content exists among a plurality of data blocks stored in the large-capacity storage system, to set any one piece of data as reference source data among the plurality of pieces of duplicate data, while replacing the data other than the reference source data with link information (reference information) whose reference location is reference source data.

If this deduplication technique is used, the duplicate data in the data blocks aggregated in the large-capacity storage system can be deleted after replacing the data other than the reference source data with the reference information. In other words, the used capacity of the large-capacity storage system can be reduced by deleting the duplicate data.

Generally, by means of the deduplication technique, the duplicate data in the data blocks which should be stored in the large-capacity storage system is replaced with the reference information as described above. Therefore, for example, if a file storage system issues a read request to the large-capacity storage system, read target data to be read according to the read request might have already replaced with the reference information.

In this case, after the reference information is firstly read, processing for reading the reference source data to which the above-mentioned reference information refers is then executed within the large-capacity storage system. Accordingly, there is a tendency that I/O (Input/Output) frequency in the large-capacity storage system increases.

In order to mitigate an increase in this I/O frequency and enhance I/O performance of the entire storage system, the deduplication technique uses a method of dividing a storage area in the large-capacity storage system into a plurality of fixed-length small areas (hereinafter referred to as the chunks) and collectively managing these small areas (hereinafter referred to as the chunk data set method).

Incidentally, each of the plurality of variable-length small areas, which are called chunks, is defined as a deduplication unit for the deduplication technique. The size of one chunk is, for example, approximately 4 KB to 128 KB. Furthermore, the chunk data set method means a method of collectively managing the plurality of small areas (chunks) as described above and sometimes means a management unit or data structure according to this method.

Now, if a data block is deleted after deduplication, a chunk data set is configured in such a manner that chunks, in which a reference source data block no longer exists because of the deletion of the data block (hereinafter referred to as the invalid chunks), and chunks in which a reference source data block exists (hereinafter referred to as the valid chunks) are mixed. In other words, the timing when a chunk becomes an invalid chunk after the deduplication is different and not uniform for each chunk in the same chunk data set.

As a result, the chunk data set method of collectively managing the plurality of chunks has a problem of difficulty in searching and deleting (releasing) only the invalid chunks.

PTL 1 discloses a technique, as a means for searching the invalid chunks, to manage the number of times of references made to the reference source data stored in the chunks (a total number of pieces of reference information whose reference location is the reference source data) on a chunk basis and recognize a chunk(s) whose number of times of references becomes 0, as a target(s) to be deleted.

CITATION LIST

Patent Literature

PTL 1: U.S. Pat. No. 6,928,526 A

SUMMARY OF INVENTION

Technical Problem

However, the technique described in PTL 1 has specifically the following three problems.

Specifically speaking, the first problem is that it is necessary to store and maintain as many pieces of management information as the number of chunks in order to manage the number of times of references on the chunk basis; and if there are an enormous number of chunks, the management information also increases accordingly. As a result, there are problems of an increase of used areas in the large-capacity storage system and the occurrence of a large number of I/Os due to updates of the number of times of references.

The second problem is that if deletion processing is executed every time any one of the plurality of chunks constituting a chunk data set becomes an invalid chunk, a large number of I/Os occur due to the deletion processing.

The third problem is that if an invalid chunk is deleted, it is necessary to change information about storage locations of valid chunks in the chunk data set. As a result, it is necessary to also change the management information for managing the reference source data, thereby causing a problem of the occurrence of a large number of I/Os.

So, as the means for solving these three problems, it may be only necessary to adopt, for example, a method of managing updates of the number of times of references on a chunk data set basis and a method of executing the deletion processing when the number of invalid chunks becomes equal to or more than a certain rate (for example, equal to or more than ½) in the chunk data set.

If the two methods are adopted as described above, the management information for managing the number of times of references on the chunk basis can be reduced and the increase of I/Os can be inhibited. However, since the number of times of references is no longer managed on the chunk basis, a new problem of losing information about which chunk in the chunk data set is an invalid chunk occurs.

Then, in order to solve the above-mentioned new problem, it is possible to, for example, search all the pieces of management information of the reference source data and determine chunks which do not contain the reference source data to be invalid chunks. However, if an attempt is made to search all the pieces of management information of the reference source data, the problem of the occurrence of a large number of I/Os emerges again.

So, the present invention was devised in consideration of the above-described circumstances and aims at providing a data management system and data management method capable of inhibiting an increase of I/Os caused by deduplication.

Solution to Problem

In order to solve the aforementioned problems, a data management system according to the present invention includes: a server for writing and reading data blocks in response to a request from a host system and managing storage and retainment of the data blocks; and a file storage system for storing and retaining management information for storing and managing the data blocks in response to a request from the server; wherein when the server manages the data blocks based on the management information stored and retained in the file storage system, the business server manages the data blocks by dividing each data block into a plurality of chunks, extracting any chunk as a judgment chunk from the plurality of chunks obtained by dividing the data blocks, and grouping the data blocks based on the extracted judgment chunk; the business server executes deduplication processing for eliminating mutually duplicate chunks on a plurality of data blocks belonging to the same group, gathers a plurality of chunks belonging to the same group after the deduplication, and manages them as a chunk data set; if a data block deletion request is issued from the host system, the business server deletes a data block, for which the deletion request was made, based on the number of times of references of a chunk data set corresponding to a group of the data block for which the deletion request was made; and if the data block for which the deletion request was made is deleted, the business server copies only chunks of the data blocks, which are not deleted, among the plurality of chunks constituting the chunk data set to a temporary area at some timing, creates a new chunk data set by gathering a plurality of chunks composed of only the chunks copied to the temporary area, and manages the created new chunk data set by replacing the existing chunk data set with the created new chunk data set.

Furthermore, in order to solve the aforementioned problems, a data management method according to the present invention includes: a first step executed by a server writing and reading data blocks in response to a request from a host system and managing storage and retainment of the data blocks; and a second step executed by a storage system storing and retaining management information for managing the data blocks in response to a request from the business server; wherein in the first step when managing the data blocks stored and retained in the storage system based on the management information stored and retained in the storage system, the server manages the data blocks by dividing each data block into a plurality of chunks, extracting any chunk as a judgment chunk from the plurality of chunks obtained by dividing the data blocks, and grouping the data blocks based on the extracted judgment chunk; the server executes deduplication processing for eliminating mutually duplicate chunks on a plurality of data blocks belonging to the same group, gathers a plurality of chunks belonging to the same group after the deduplication, and manages them as a chunk data set; if a data block deletion request is issued from the host system, the server judges, based on the number of times of references of a chunk data set corresponding to a group of the data block for which the deletion request was made, whether or not the chunk data set should be a target of garbage collection; and if the chunk data set is determined to be the target of garbage collection, the server copies only chunks of the data blocks, which are not deleted, among the plurality of chunks constituting the chunk data set to a temporary area at some timing, creates a new chunk data set by gathering a plurality of chunks composed of only the chunks copied to the temporary area, and manages the created new chunk data set by replacing the existing chunk data set with the created new chunk data set.

Advantageous Effects of Invention

According to the present invention, an increase of I/Os due to deduplication can be inhibited.

DESCRIPTION OF EMBODIMENTS

An embodiment of the present invention will be described below in detail with reference to the attached drawings.

Figure 1:
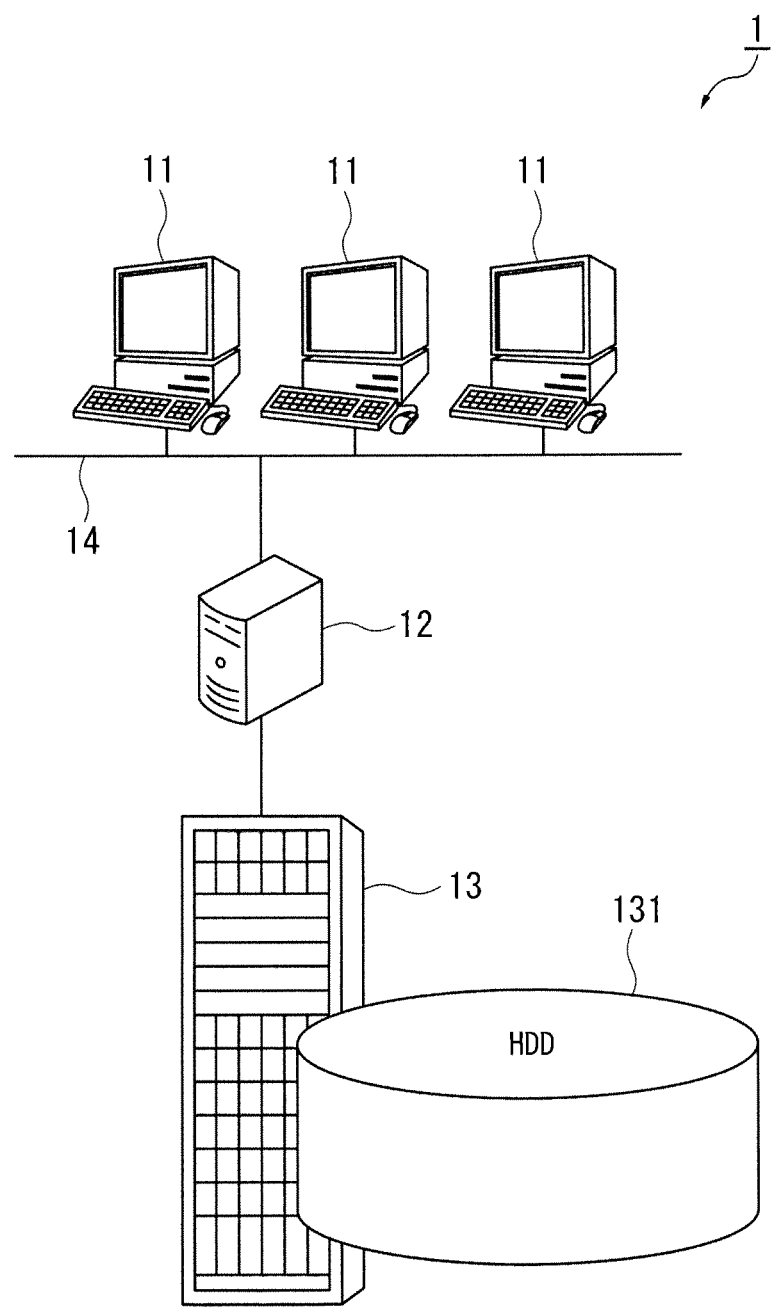
FIG. 1 is a block diagram showing the overall configuration of a data management system.

(1) Data Management System and Data Management Method According to First Embodiment (1-1) Configuration of Data Management System According to First Embodiment Referring to FIG. 1, the reference numeral 1 represents a data management system 1 according to a first embodiment as a whole. This data management system 1 is configured by including clients 11, a server 12, and a large-capacity storage system 13. Then, the clients 11 and the server 12 are connected via a LAN (Local Area Network) 14 within the data management system 1.

The client 11 is an upper-level computer that writes data blocks to the large-capacity storage system 13 and reads data blocks from the large-capacity storage system 13 via the server 12; and includes, for example, a CPU (Central Processing Unit), memory, and storage devices not shown in the drawing.

The server 12 is a computer that provides services to the client 11 in response to a data read/write request from the client 11; and includes, for example, a CPU, memory, and storage devices not shown in the drawing. For example, the server 12 is a NAS (Network Attached Storage) server and is configured by including management information (file system) for managing data blocks of files used in the data management system 1.

The large-capacity storage system 13 is a storage apparatus for storing and retaining data and includes a plurality of physical disks and a controller for controlling reading/writing of data blocks from/to these physical disks. The physical disks are composed of, for example, expensive disks such as SCSI (Small Computer System Interface) disks. Furthermore, the large-capacity storage system 13 includes a large-capacity HDD (Hard Disc Drive) 131 as a data storage disk.

Figure 2:
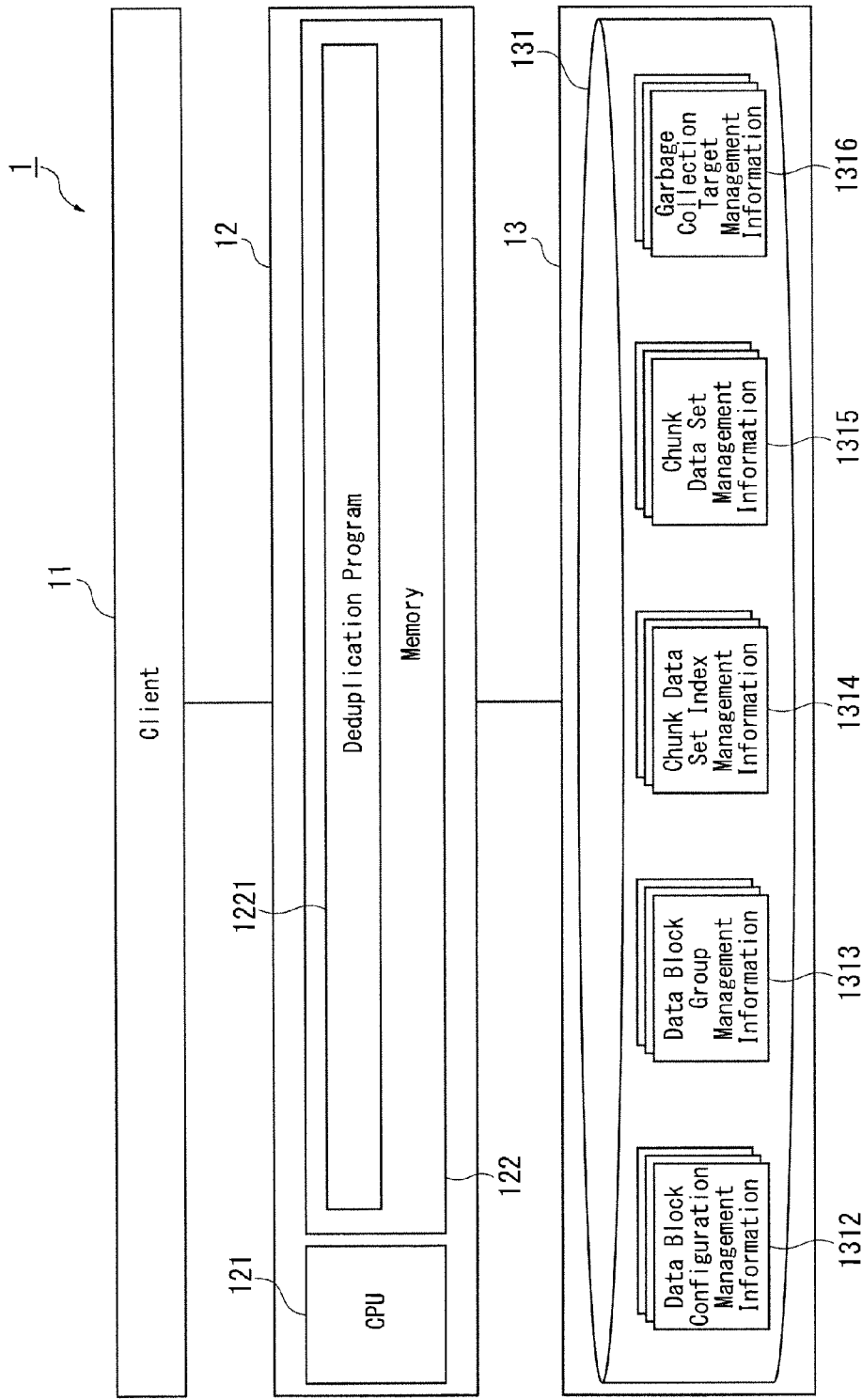
FIG. 2 is a block diagram showing a logical configuration of the data management system.

FIG. 2 shows a logical configuration diagram of the data management system 1 shown in FIG. 1. The data management system 1 is composed of the clients 11, the server 12, and the large-capacity storage system 13 as mentioned earlier.

The client 11 is a computer configured by including, for example, a CPU and memory not shown in the drawing and is a host system that reads/writes data blocks from/to the large-capacity storage system 13 via the server 12.

The server 12 is a computer configured by including, for example, a CPU 121 and a memory 122 and reads/writes data blocks from/to the large-capacity storage apparatus 13 in response to a data block read/write request from the client 11 which is a host system.

The memory 122 is configured by storing a deduplication program 1221. The CPU 121 executes deduplication processing for deleting duplicate data in the large-capacity storage system 13 in cooperation with the deduplication program 1221 stored in this memory 122. The deduplication processing will be explained later in detail.

The large-capacity storage system 13 is configured by including management information (1312 to 1316) for managing deduplication of data of data blocks.

The management information (1312 to 1316) includes data block configuration management information 1312, data block group management information 1313, chunk data set index management information 1314, chunk data set management information 1315, and garbage collection target management information 1316. Each piece of management information (1312 to 1316) will be explained below.

(1-2) Management Information According to First Embodiment

Figure 3:
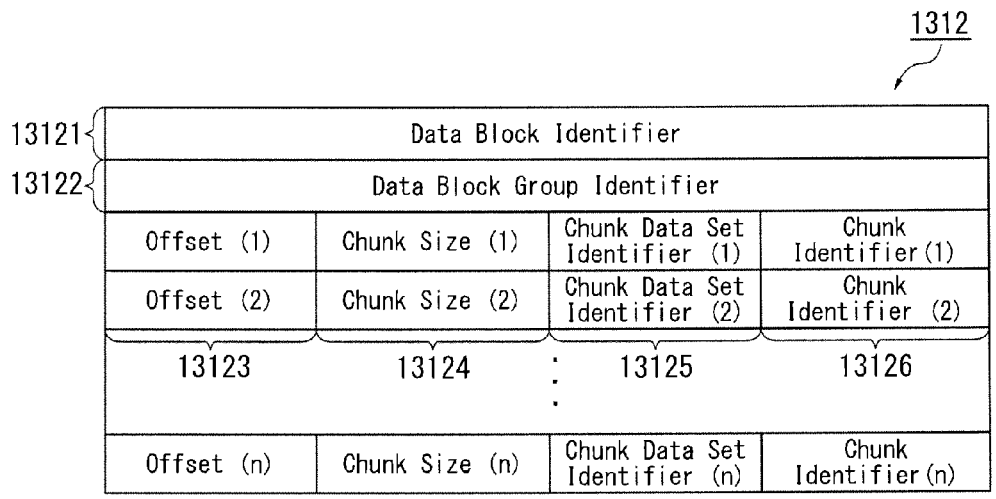
FIG. 3 is a conceptual diagram of data block configuration management information.

FIG. 3 shows a conceptual diagram of the data block configuration management information 1312 wherein one piece of the data block configuration management information 1312 exists for each data block (such as a file) and is used to manage where chunks constituting the relevant data block are stored.

The data block configuration management information 1312 has a table structure constituted from a data block identifier field 13121, a data block group identifier field 13122, offset fields 13123, chunk size fields 13124, chunk data set identifier fields 13125, and chunk identifier fields 13126.

The data block identifier field 13121 stores an identifier of the relevant data block. Furthermore, the data block group identifier field 13122 stores an identifier of the relevant group when the data block is grouped into a group having a relationship of valid deduplication. Incidentally, regarding grouping, for example, a data block already stored and retained in the large-capacity storage system 13 and a data block having a derivative relationship with the former data block are grouped into the same group.

The offset field 13123 stores positional information from the top of the relevant data block. Furthermore, the chunk size field 13124 stores a chunk size.

The chunk data set identifier field 13125 stores an identifier of a chunk data set storing a plurality of chunks. Furthermore, the chunk identifier field 13126 stores an identifier of the relevant chunk.

Figure 4:
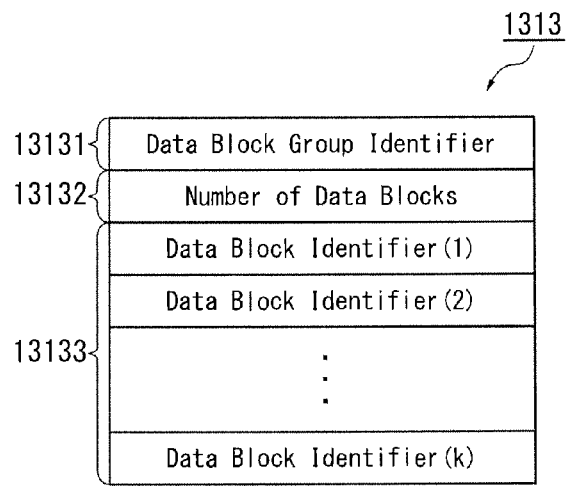
FIG. 4 is a conceptual diagram showing the structure of data block group management information.

FIG. 4 shows a conceptual diagram of the data block group management information 1313 wherein one piece of the data block group management information 1313 exists for each data block group and is used to manage a group of data blocks having a relationship of valid deduplication.

The data block group management information 1313 has a table structure constituted from a data block group identifier field 13131, a number-of-data-blocks field 13132, and data block identifier fields 13133.

The data block group identifier field 13131 stores an identifier of a group when data blocks are grouped into a group having a relationship of valid deduplication. Furthermore, the number-of-data-blocks field 13132 stores the number of data blocks belonging to the same group. Also, the data block identifier field 13133 stores identifiers of data blocks belonging to the same group.

Incidentally, regarding the above-described data block group management information 1313, a predetermined threshold value may be set to the data block size so that a data block group equal to or less than the threshold value will not be created or managed. By preventing the creation and management of a data block group equal to or less than the threshold value as described above, consumption of storage areas by the management information can be reduced when data blocks are small.

Figure 5:
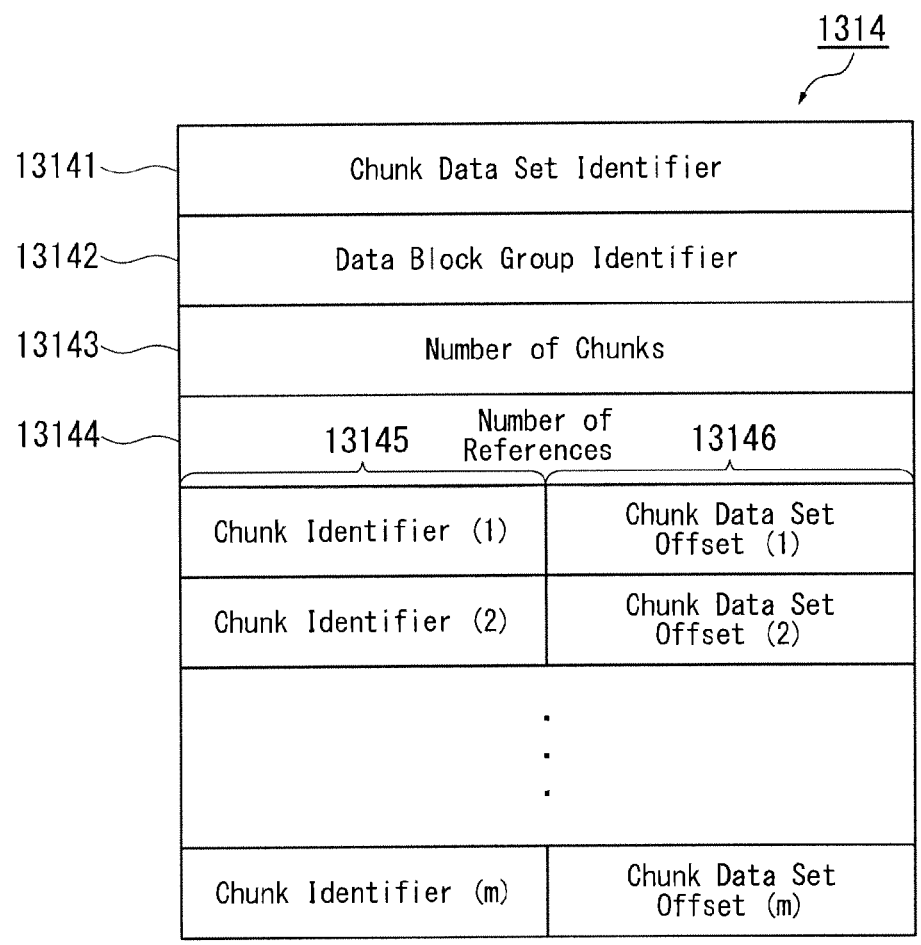
FIG. 5 is a conceptual diagram showing the structure of chunk data set index management information.

FIG. 5 shows a conceptual diagram of the chunk data set index management information 1314 wherein one piece of the chunk data set index management information 1314 exists for each chunk data set and is used to manage chunks stored in the relevant chunk data set.

The chunk data set index management information 1314 has a table structure constituted from a chunk data set identifier field 13141, a data block group identifier field 13142, a number-of-chunks field 13143, a number-of-references field 13144, chunk identifier fields 13145, and chunk data set offset fields 13146.

The chunk data set identifier field 13141 stores an identifier of the relevant chunk data set in which a plurality of chunks are stored. Furthermore, the data block group identifier field 13142 stores an identifier of a group when data blocks are grouped into a group having a relationship of valid deduplication.

The number-of-chunks field 13143 stores the number of chunks stored in the relevant chunk data set. Furthermore, the number-of-references field 13144 stores a total number of times of references made from the data blocks to the chunks stored in the relevant chunk data set.

The chunk identifier field 13145 stores an identifier of a chunk. Also, the chunk data set offset field 13146 stores positional information about the position of the relevant chunk, which is stored in the chunk data set, in the chunk data set.

Figure 6:
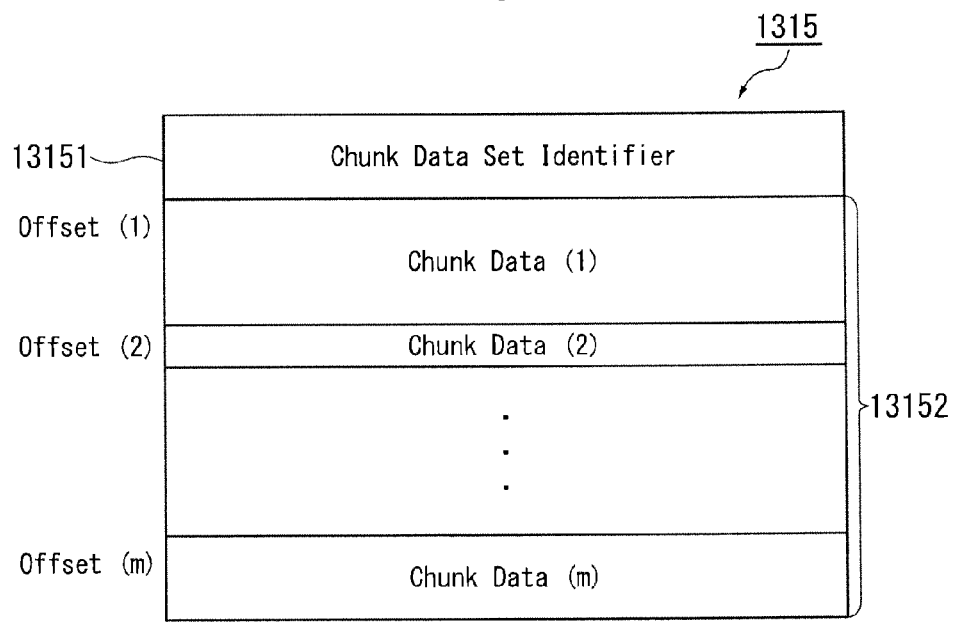
FIG. 6 is a conceptual diagram showing the structure of chunk data set management information.

FIG. 6 shows a conceptual diagram of the chunk data set management information 1315 wherein one piece of the chunk data set management information 1315 exists for each chunk data set and is used to collectively manage chunks of data blocks having a relationship of valid deduplication.

The chunk data set management information 1315 has a table structure constituted from a chunk data set identifier field 13151 and chunk data fields 13152.

The chunk data set identifier field 13151 stores an identifier of the relevant chunk data set. Furthermore, the chunk data field 13152 stores chunk data.

Figure 7:
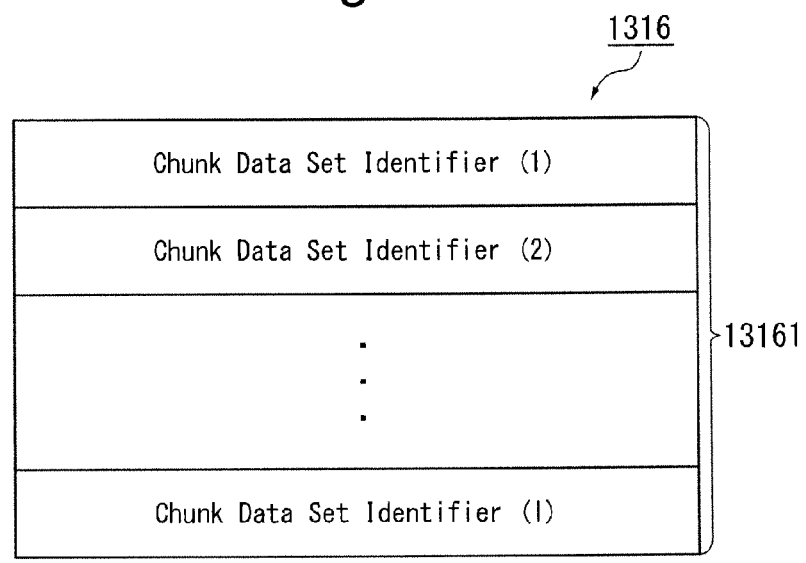
FIG. 7 is a conceptual diagram showing the structure of garbage collection target management information.

FIG. 7 shows a conceptual diagram of the garbage collection target management information 1316 for managing chunk data sets regarding which the number of times of references made to the relevant chunk data set becomes equal to or less than a predetermined threshold value, so that the relevant chunk data set becomes a target of garbage collection (release of a storage area which is no longer necessary).

The garbage collection target management information 1316 has a table structure constituted from chunk data set identifier fields 1316.

The chunk data set identifier field 1316 stores an identifier of a chunk data set which has become a garbage collection target.

(1-3) Outline of Data Block Grouping Processing According to First Embodiment

Figure 8:
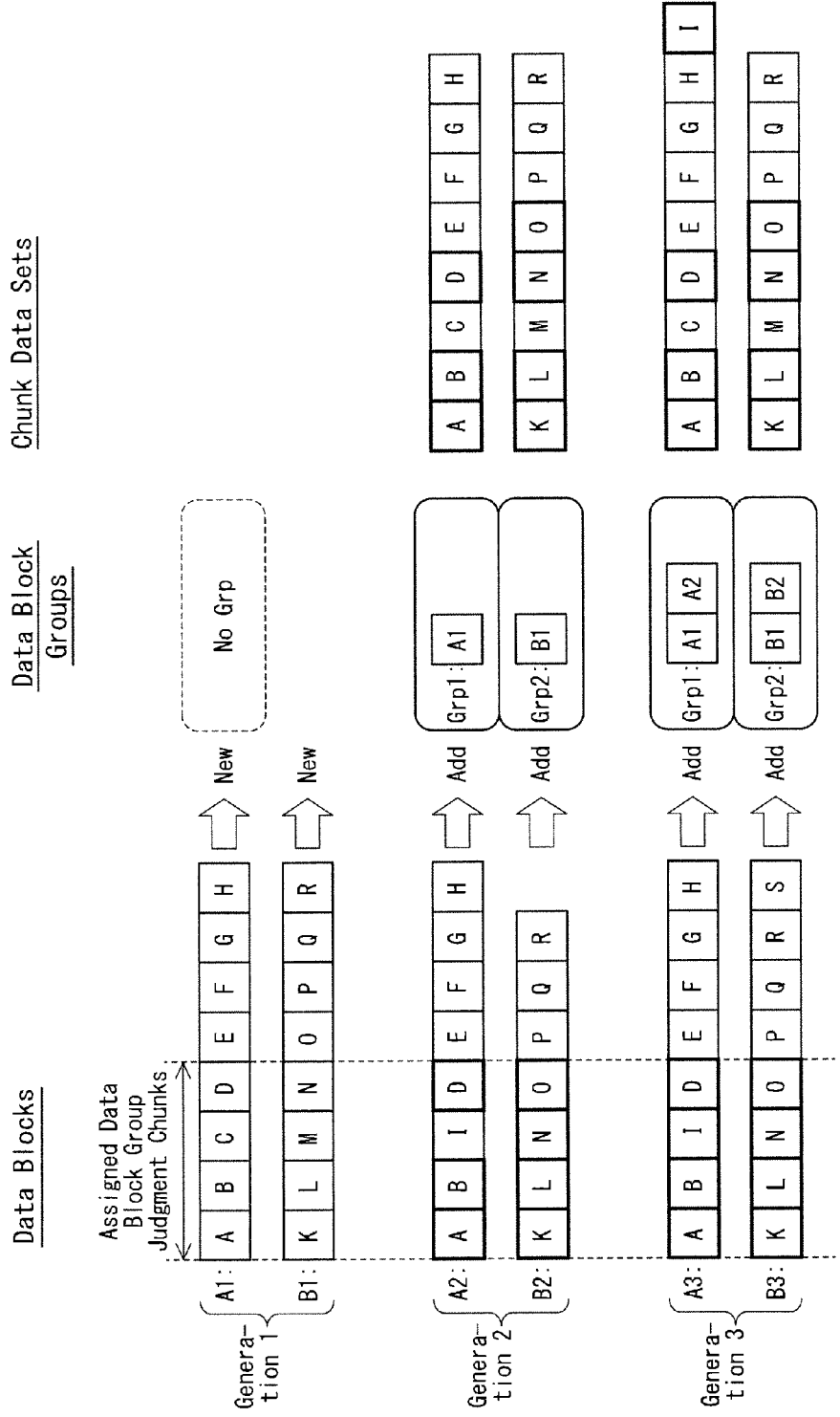
FIG. 8 is a conceptual diagram showing the outline of grouping processing.

FIG. 8 shows the outline of data block grouping processing according to the first embodiment. In this section, a data management method performed in the large-capacity storage system 13 when data is written from the client 11, which is a host system, via the server 12 to the large-capacity storage system 13 (for example, when periodical backups are performed) will be explained below in chronological order (from generation 1 to generation 3).

Incidentally, processing explained below is executed by cooperation of the CPU 121 and the deduplication program 1221 of the server 12.

Firstly, it is shown that in generation 1, a new request is issued to the server 12 to write a data block A1 whose data block identifier is A1 and a data block B1 whose data block identifier is B1.

Four chunks from the top of each data block A1 and B1 are chunks extracted as assigned data block group judgment chunks. By extracting these assigned data block group judgment chunks as sampling data, it is possible to judge whether, for example, the data block A1 and a data block A2 described later have a relationship of valid deduplication (derivative relationship) or not. Also, it is possible to judge whether the data block A1 and the data block A2 should be made to belong to the same data block group or not.

In generation 1, the data blocks A1 and B1 are newly stored data blocks and, therefore, they do not belong to any data block group.

Therefore, in this generation 1, data block groups Grp1 and Grp2 are newly set as new data block groups and the data blocks A1 and B1 are made to belong to the new data block groups Grp1 and Grp2 which are newly set, respectively.

Furthermore, in generation 1, a plurality of chunks belonging to the same data block group are gathered and managed as one chunk data set. For example, since only the data block A1 belongs to the data block group Grp1 and the data block A1 is composed of a plurality of chunks A to H, the chunks A to H will be directly managed as a chunk data set. Similarly, since only the data block B1 belongs to the data block group Grp2 and the data block B1 is composed of a plurality of chunks K to R, the chunk K to R will be directly managed as a chunk data set.

Next, it is shown that in generation 2, a new request is issued to the server 12 to write a data block A2 whose data block identifier 11 is A2 and a data block B2 whose data block identifier is B2.

In generation 2, the data block A2 is determined to be a data block having a derivative relationship with the data block A1 based on the assigned data block group judgment chunks. In other words, the data block A2 is determined to be a data block created based on the data block A1 (or derived from the data block A1). Therefore, the data block A2 belongs to the same data block group Grp1 as the data block A1.

Furthermore, in generation 2, the data blocks A1 and A2 belong to the same data block group Grp1, so that a plurality of chunks constituting the data blocks A1 and A2 will be gathered and managed as one chunk data set. Specifically speaking, the data block A 1 is composed of a plurality of chunks A to H and the data block A2 are composed of the plurality of chunks A to H in which C is replaced with I. As a result, the chunks A to I will be managed as a chunk data set.

In generation 2, the data block B2 is determined, similarly to the data block A2, to be a data block having a derivative relationship with the data block B1 based on the assigned data block group judgment chunks. So, the data block B2 belongs to the same data block group Grp2 as the data block B1.

Furthermore, in generation 2, the data blocks B1 and B2 belong to the same data block group Grp2, so that a plurality of chunks constituting the data blocks B1 and B2 will be gathered and managed as one chunk data set. Specifically speaking, the data block B1 is composed of a plurality of chunks K to R and the data block B2 is composed of the plurality of chunks K to R from which M is deleted. As a result, the chunks K to R will be managed as a chunk data set.

Next, it is shown that in generation 3, a new request is issued to the server 12 to write a data block A3 whose data block identifier 11 is A3 and a data block B3 whose data block identifier is B3.

In generation 3, the data block A3 is determined to be a data block having a derivative relationship with the data block A1 based on the assigned data block group judgment chunks. Therefore, the data block A3 belongs to the same data block group Grp1 as the data block A1.

Furthermore, since in generation 3 the data blocks A1 to A3 belong to the same data block group Grp1, a plurality of chunks constituting the data blocks A1 to A3 are gathered and managed as one chunk data set. Specifically speaking, the data block A1 is composed of the plurality of chunks A to H and the data blocks A2 and A3 are composed of the plurality of chunks A to H in which C is replaced with I. Therefore, the chunks A to I are managed as a chunk data set.

Moreover, in generation 3, the data block B3 is determined, similarly to the data block A3, to be a data block having a derivative relationship with the data block B1 based on the assigned data block group judgment chunks. As a result, the data block B3 belongs to the same data block group Grp2 as the data block B1.

Furthermore, since in generation 3 the data blocks B1 to B3 belong to the same data block group Grp2, a plurality of chunks constituting the data blocks B1 to B3 are gathered and managed as one chunk data set. Specifically speaking, the data block B1 is composed of the plurality of chunks K to R, the data block B2 is composed of the plurality of chunks K to R from which M is deleted, and the data block B3 is composed of the chunks K to S from which M is deleted. As a result, the chunks K to S are managed as a chunk data set.

(1-4) Outline of Data Block Deletion Processing According to First Embodiment

Figure 9:
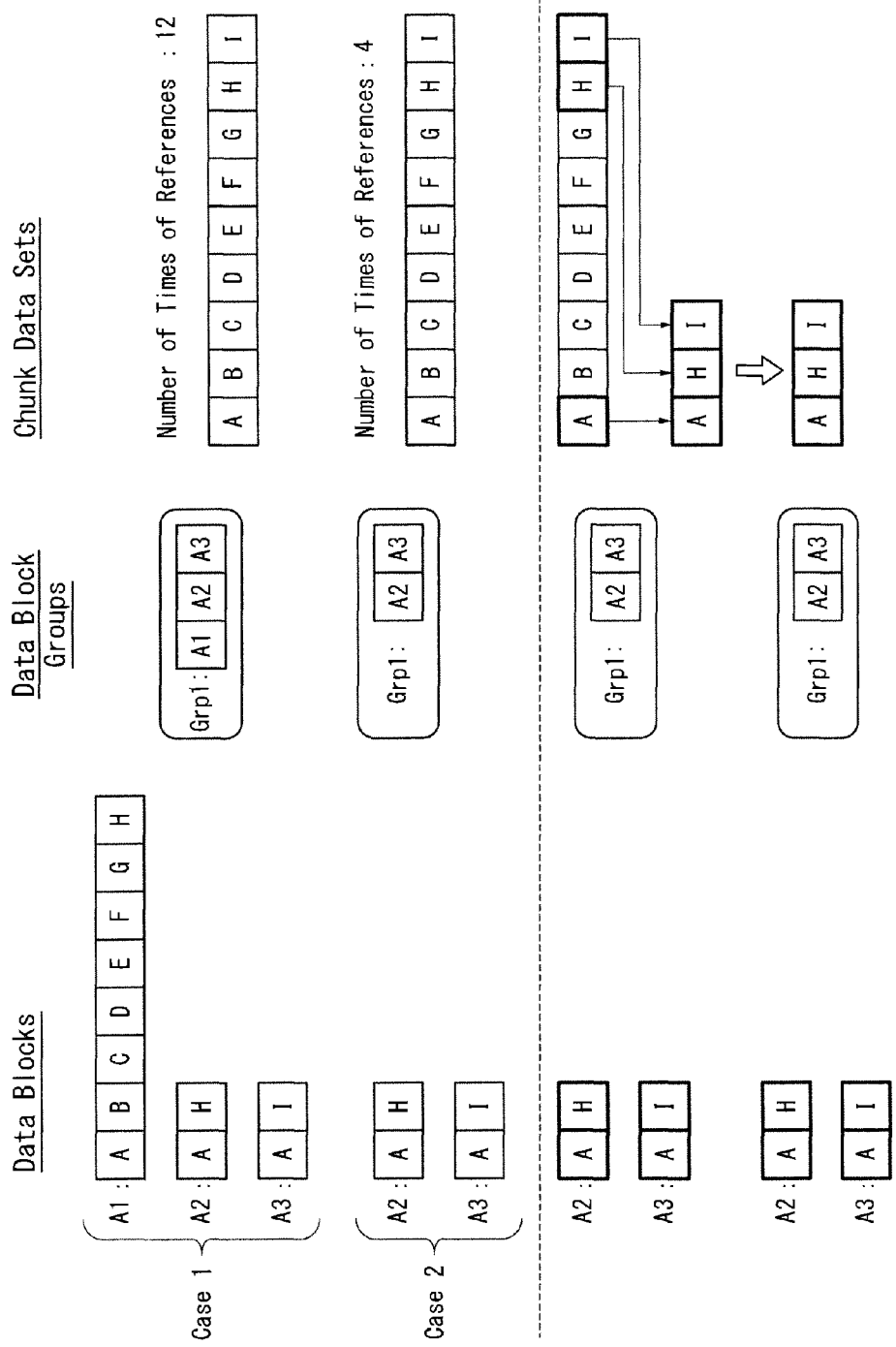
FIG. 9 is a conceptual diagram showing the outline of data block deletion processing.

FIG. 9 shows the outline of data block deletion processing according to the first embodiment. In this section, a data management method performed when a data deletion request is issued from the client 11, which is a host system, to the server 12 will be explained below.

Incidentally, processing explained below is executed by cooperation of the CPU 121 and the deduplication program 1221 of the server 12. Also, processing of an upper part and processing of a lower part (the upper part and the lower part divided by a broken line) are executed asynchronously.

Firstly, two cases will be explained with respect to the upper part.

In Case 1, it is shown that the data block A1 whose data block identifier is A1, the data block A2 whose data block identifier is A2, and the data block A3 whose data block identifier is A3 are stored. It is also shown that the data blocks A1 to A3 belong to the same data block group Grp1 based on the assigned data block group judgment chunks. Furthermore, it is shown that a chunk data set is composed of the chunks A to I obtained by gathering a plurality of chunks constituting the data blocks A1 to A3.

In case 1, the number of times of references (a total number of times of reference made from the data blocks A1 to A3 to the chunks A to I constituting the chunk data set) is 12 times.

In case 2, it is shown that when the data block A1 whose data block identifier is A1, the data block A2 whose data block identifier is A2, and the data block A3 whose data block identifier is A3 are stored, the data block A1 is deleted in response to a deletion request from the client 11. In this case, the data block A1 is deleted from the data block group Grp1. Then, the chunk data set remains to be composed of the chunks A to I, which are obtained by gathering the plurality of chunks constituting the data blocks A1 to A3, for a while in consideration of an increase of I/Os caused by the deletion processing.

In case 2, the number of times of references (a total number of times of reference made from the data blocks A2 and A3 to the chunks A to I constituting the chunk data set) is 4 times. For example, if the predetermined threshold value is 10 times in case 2, the actual number of times of references (4 times) is less than the threshold value (10 times). As a result, if a deletion request to delete the data block A1 is made by the client 11, the chunk data set becomes the target of garbage collection.

Next, the lower part when the data block A1 is deleted in case 2 of the upper part will be explained. It should be noted that the processing of the upper part and the processing of the lower part are executed asynchronously. The increase of response time for the deletion request from the client can be inhibited by having the above-described processing executed asynchronous.

The lower part shows processing after the data block A1 is deleted in response to the deletion request from the client 11 and it is shown that only the data blocks A2 and A3 are stored in the large-capacity storage system 13. Furthermore, since the chunk data set is composed of the plurality of chunks constituting the data blocks A2 and A3, it is reset to a chunk data set composed of the chunks A, H and I, which is then managed.

(1-5) Deduplication Processing According to First Embodiment

Figure 10:
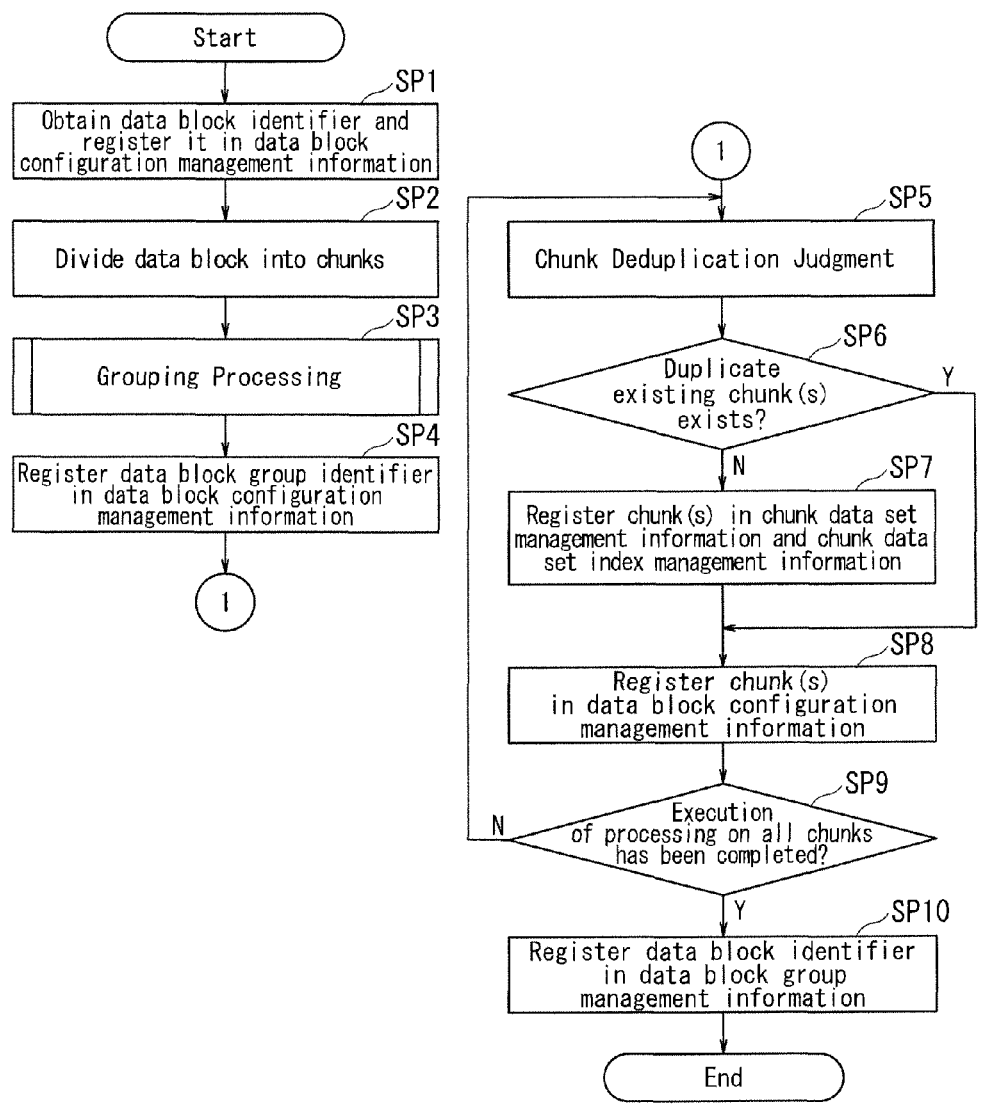
FIG. 10 is a flowchart illustrating a processing sequence for deduplication processing.

FIG. 10 shows a processing sequence for the entire deduplication processing. This deduplication processing is executed by cooperation of the CPU 121 and the deduplication program 1221 of the server 12 which receives a backup instruction from the client 11. For convenience of explanation, the deduplication program will be referred to as a processing subject in the following explanation.

The deduplication program 1221 obtains the data block identifier of a data block for which a write request is made and registers the obtained data block identifier in the data block configuration management information 1312 (SP1).

Next, the deduplication program 1221 divides the data block corresponding to the registered data block identifier into a plurality of chunks (SP2).

Then, the deduplication program 1221 executes grouping processing for grouping the data block corresponding to the registered data block identifier (SP3).

The grouping processing is processing, which will be explained later with reference to FIG. 11, for making data blocks having a relationship of valid deduplication (derivative relationship) belong to the same group and thereby limiting a search range for a case of invalid chunk search and inhibiting an increase of I/Os.

Next, the deduplication program 1221 registers the data block group identifier of the grouped data blocks in the data block configuration management information 1312 (SP4).

Then, the deduplication program 1221 executes chunk deduplication judgment processing (SP5).

During the chunk deduplication judgment processing, for example, the deduplication program 1221 compares a hash value of a backup target chunk with a hash value of a chunk already retained in the large-capacity storage system 13 and thereby judges whether the same hash value exists or not. Incidentally, in fact, management information for managing hash values of chunks stored and retained in the large-capacity storage system 13 is stored in the large-capacity storage system 13 in advance and a hash value of this management information is compared with the hash value of the backup target chunk.

The deduplication program 1221 judges whether or not the backup target chunk is a duplicate chunk of a chunk already stored and retained in the large-capacity storage system 13 (SP6).

If the deduplication program 1221 obtains an affirmative judgment result in this step, it proceeds to step SP8.

On the other hand, if the deduplication program 1221 obtains a negative judgment result in step SP6, it registers the chunk in the chunk data set index management information 1314 and the chunk data set management information 1315 (SP7).

Next, the deduplication program 1221 registers the chunk in the data block configuration management information 1312 (SP8).

The deduplication program 1221 judges whether the execution of the above-described processing on all chunks has been completed or not (SP9).

If the deduplication program 1221 obtains a negative judgment result in this step, it proceeds to step SP5 and executes the same processing as the above-described processing again.

On the other hand, if the deduplication program 1221 obtains an affirmative judgment result in step SP9, it registers the data block identifier in the data block group management information 1313 (SP10) and then terminates this deduplication processing.

Figure 11:
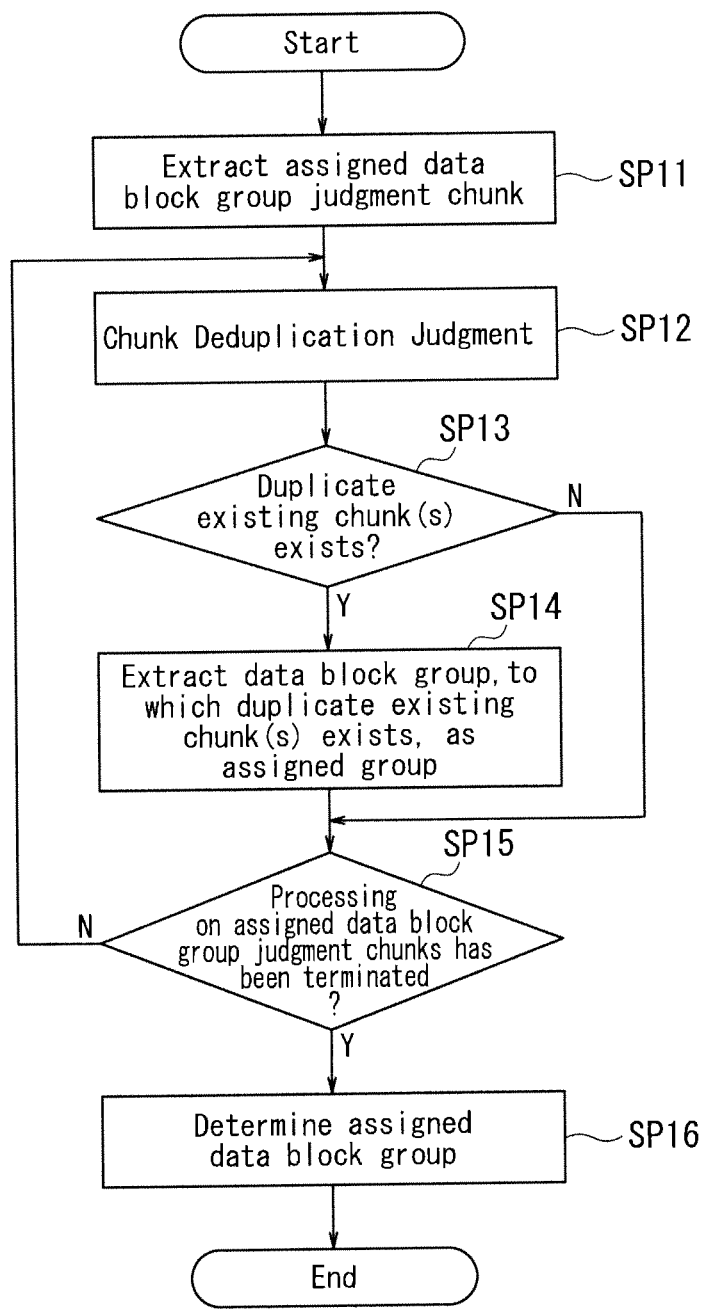
FIG. 11 is a flowchart illustrating a processing sequence for the grouping processing.

FIG. 11 shows a processing sequence for grouping processing. This grouping processing is the grouping processing in the deduplication processing shown in FIG. 10 and is executed by cooperation of the CPU 121 and the deduplication program 1221 of the server 12. For convenience of explanation, the deduplication program will be referred to as a processing subject in the following explanation.

The deduplication program 1221 extracts the assigned data block group judgment chunks with respect to the backup target data block (SP11).

The deduplication program 1221 executes chunk deduplication judgment processing by using the extracted assigned data block group judgment chunks (SP12).

The deduplication program 1221 judges whether or not a duplicate chunk(s) of the extracted assigned data block group judgment chunks is already stored and retained the large-capacity storage system 13 (SP13).

If the deduplication program 1221 obtains a negative judgment result in this step, it proceeds to step SP15.

On the other hand, if the deduplication program 1221 obtains an affirmative judgment result in step SP13, it extracts a data block group, to which the duplicate existing chunk belongs, as an assigned group candidate to which the backup target chunk should belong (SP14).

The deduplication program 1221 judges whether the execution of the above-described processing on all the assigned data block group judgment chunks (for example, four assigned data block group judgment chunks in this case) has been completed or not (SP15).

If the deduplication program 1221 obtains a negative judgment result in this step, it proceeds to step SP12 and executes the above-described processing again.

On the other hand, if the deduplication program 1221 obtains an affirmative judgment result in step SP15, it determines an assigned data block group, to which the backup target data block should belong (SP16), and then terminates this grouping processing.

Incidentally, if no assigned group candidate to be extracted in step SP14 exists, the deduplication program 1221 creates a new data block group in step 16. However, if the size of the data block is smaller than a predetermined threshold value, the data block group may not be created. By not creating a data block group whose size is equal to or less than the threshold value, it is possible to inhibit an unnecessary increase of the data block group management information 1313 and reduce the used capacity of the large-capacity storage system 13.

Incidentally, if the deduplication program 1221 extracts a plurality of assigned group candidates in step SP14, it may determine in step SP16 that the backup target data block should not belong to any of the data block groups or should belong to any one of the data block groups. According to the first embodiment, if a plurality of assigned group candidates are extracted in step SP14, the backup target data block is made to not belong to any of the data block groups in step SP16.

Figure 12:
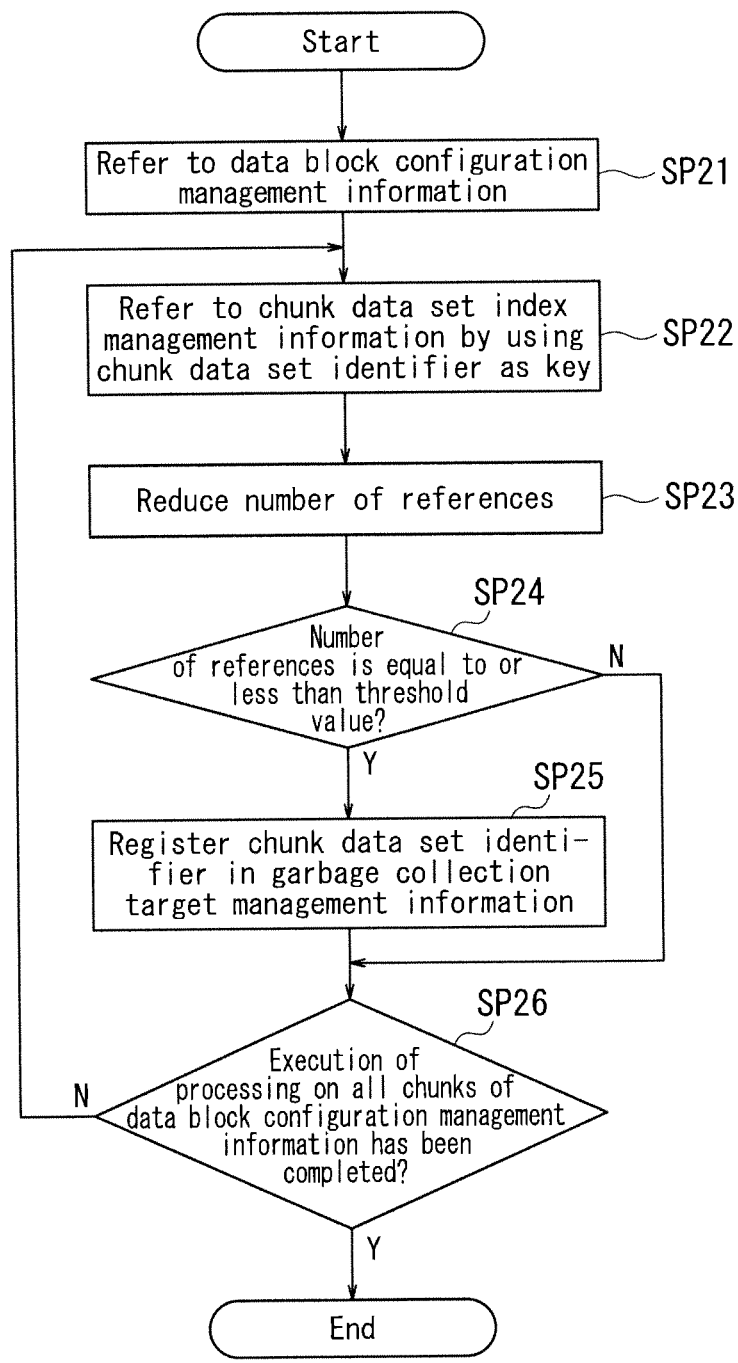
FIG. 12 is a flowchart illustrating a processing sequence for the data block deletion processing.

FIG. 12 shows a processing sequence for data block deletion processing. This data block deletion processing is processing executed when deleting a data block in response to a data block deletion request from the client 11. Also, this data block deletion processing is executed by cooperation of the CPU 121 and the deduplication program 1221 of the server 12. For convenience of explanation, the deduplication program will be referred to as a processing subject in the following explanation.

The deduplication program 1221 refers to the data block configuration management information 1312 stored in the large-capacity storage system 13 (SP21).

Next, the deduplication program 1221 further uses a chunk data set identifier, which is stored in the data block configuration management information 1312, as a key and refers to the chunk data set index management information 1314 corresponding to this chunk data set identifier (SP22).

Then, the deduplication program 1221 reduces the number of references of the chunk data set index management information 1314 (SP23).

Subsequently, the deduplication program 1221 judges whether or not the reduced number of references is equal to or less than a predetermined threshold value (SP24).

If the deduplication program 1221 obtains a negative judgment result in this step, it proceeds to step SP26.

On the other hand, if the deduplication program 1221 obtains an affirmative judgment result in step SP24, it registers the chunk data set identifier in the garbage collection target management information 1316 (SP25).

Then, the deduplication program 1221 judges whether the execution of the above-described processing on all the chunks stored in the data block configuration management information 1312 has been completed or not (SP26).

If the deduplication program 1221 obtains a negative judgment result in this step, it proceeds to step SP22 and executes the above-described processing on all the chunks stored in the chunk data set index management information 1314.

On the other hand, if the deduplication program 1221 obtains an affirmative judgment result in step SP26, it terminates this data block deletion processing.

Figure 13:
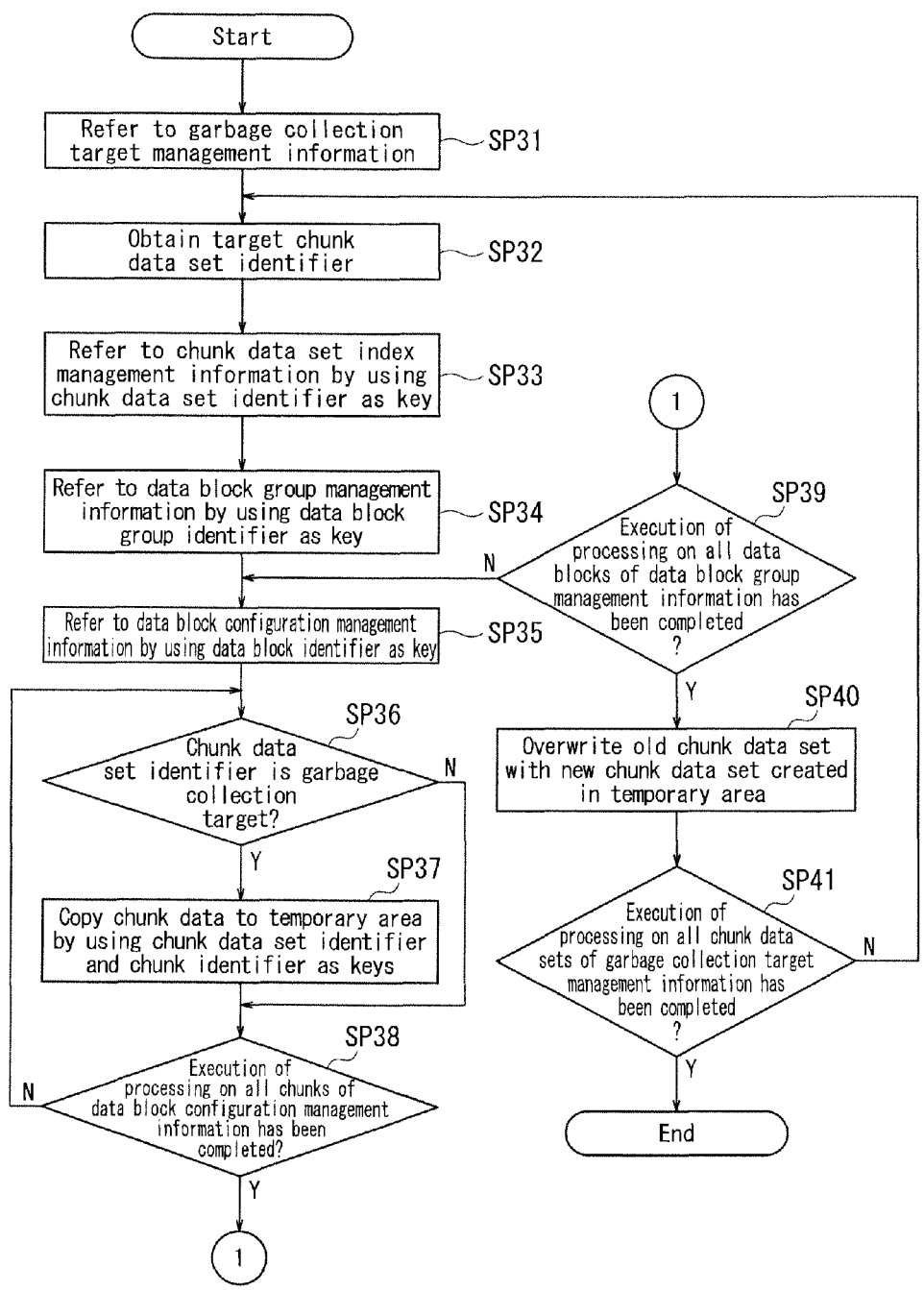
FIG. 13 is a flowchart illustrating a processing sequence for garbage collection processing.

FIG. 13 shows a processing sequence for garbage collection processing. This garbage collection processing is processing executed asynchronously with the data block deletion processing shown in FIG. 12 and is processing executed when a data block is deleted in response to a data block deletion request from the client 11. Also, this garbage collection processing is executed by cooperation of the CPU 121 and the deduplication program 1221 of the server 12. For convenience of explanation, the deduplication program will be referred to as a processing subject in the following explanation.

The deduplication program 1221 refers to the garbage collection target management information 1316 (SP31).

Next, the deduplication program 1221 obtains a chunk data set identifier of a garbage collection target from the garbage collection target management information 1316 (SP32).

Then, the deduplication program 1221 refers to the corresponding chunk data set index management information 1314 by using the obtained chunk data set identifier of the garbage collection target as a key (SP33).

Subsequently, the deduplication program 1221 refers to the corresponding data block group management information 1313 by using the data block group identifier of the chunk data set index management information 1314 as a key (SP34).

Then, the deduplication program 1221 refers to the corresponding data block configuration management information 1312 by using the data block identifier of the data block group management information 1313 as a key (SP35).

The deduplication program 1221 judges whether or not a chunk data set identifier of the garbage collection target exists in the data block configuration management information 1312 (SP36).

If the deduplication program 1221 obtains a negative judgment result in this step, it proceeds to step SP38.

On the other hand, if the deduplication program 1221 obtains an affirmative judgment result in step SP36, it uses the chunk data set identifier and the chunk identifiers of the garbage collection target of the data block configuration management information 1312 as keys and copies chunk data, which correspond to these identifiers, to a temporary area (SP37).

The deduplication program 1221 judges whether the execution of the above-described processing on all the chunks in the data block configuration management information 1312 has been completed or not (SP38).

If the deduplication program 1221 obtains a negative judgment result in this step, it proceeds to step SP36 and executes the above-described processing again.

On the other hand, if the deduplication program 1221 obtains an affirmative judgment result in step SP38, it judges whether the execution of the above-described processing on all the data blocks in the data block group management information 1313 has been completed or not (SP39).

If the deduplication program 1221 obtains a negative judgment result in this step, it proceeds to step SP35 and executes the above-described processing again.

On the other hand, if the deduplication program 1221 obtains an affirmative judgment result in step SP39, it gathers a plurality of chunks, which have been copied to the temporary area, to create a new chunk data set and overwrites the existing chunk data set with this created new chunk data set (SP40).

The deduplication program 1221 judges whether the execution of the above-described processing on all the chunk data sets stored in the garbage collection target management information 1316 has been completed or not (SP41).

If the deduplication program 1221 obtains a negative judgment result in this step, it proceeds to step SP32 and executes the above-described processing again.

On the other hand, if the deduplication program 1221 obtains an affirmative judgment result in step SP41, it terminates this garbage collection processing.

(1-6) Advantageous Effects of First Embodiment

If the data management system 1 and the data management method according to the first embodiment are used as described above, data blocks having a relationship of valid deduplication (derivative relationship) can be made to belong to the same group based on the assigned data block group judgment chunks.

Moreover, chunks constituting a plurality of data blocks which are made to belong to the same group can be gathered and managed as one chunk data set.

Furthermore, when a chunk which contains no reference source data block (invalid chunk) is to be searched and deleted after deleting the data block, it is only necessary to search the invalid chunk with respect to only the group to which the deleted data block belonged. So, the invalid chunk search range can be limited and an increase of I/Os can be inhibited.

(2) Data Management System and Data Management Method according to Second Embodiment A second embodiment will describe a data management system and data management method for reducing consumption of storage areas by an invalid chunk(s) without changing the position of each chunk in a chunk data set by filling the invalid chunk(s) in the chunk data set with 0 after deleting a data block.

In the following explanation of the second embodiment, an explanation of the same configuration as that of the first embodiment has been omitted and only the configuration different from that of the first embodiment will be explained.

(2-1) Management Information According to Second Embodiment

Figure 14:
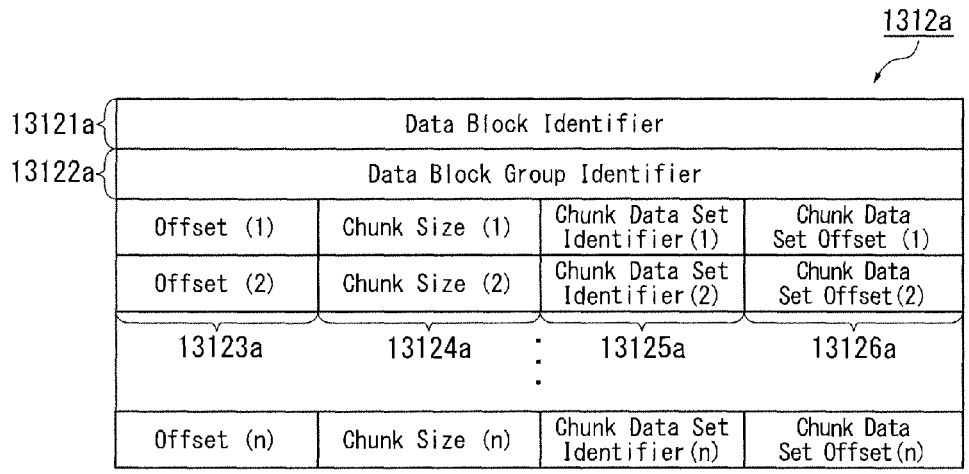
FIG. 14 is a conceptual diagram of data block configuration management information according to a second embodiment.

FIG. 14 shows a conceptual diagram of data block configuration management information 1312*a* wherein one piece of the data block configuration management information 1312*a* exists for each data block (such as a file) and is used to manage where chunks constituting the relevant data block are stored.

The data block configuration management information 1312*a* has a table structure constituted from a data block identifier field 13121*a*, a data block group identifier field 13122*a*, offset fields 13123*a*, chunk size fields 13124*a*, chunk data set identifier fields 13125*a*, and chunk data set offset fields 13126*a*.

The data block identifier field 13121*a* stores an identifier of the relevant data block. Furthermore, the data block group identifier field 13122*a* stores an identifier of a group when data blocks are grouped into a group having a relationship of valid deduplication.

The offset field 13123*a* stores positional information from the top of the relevant data block. Also, the chunk size field 13124*a* stores a chunk size.

The chunk data set identifier field 13125*a* stores an identifier of a chunk data set in which a plurality of chunks are stored. Furthermore, the chunk data set offset field 13126*a* stores positional information of chunks, which are stored in the relevant chunk data set, in the chunk data set.

Figure 15:
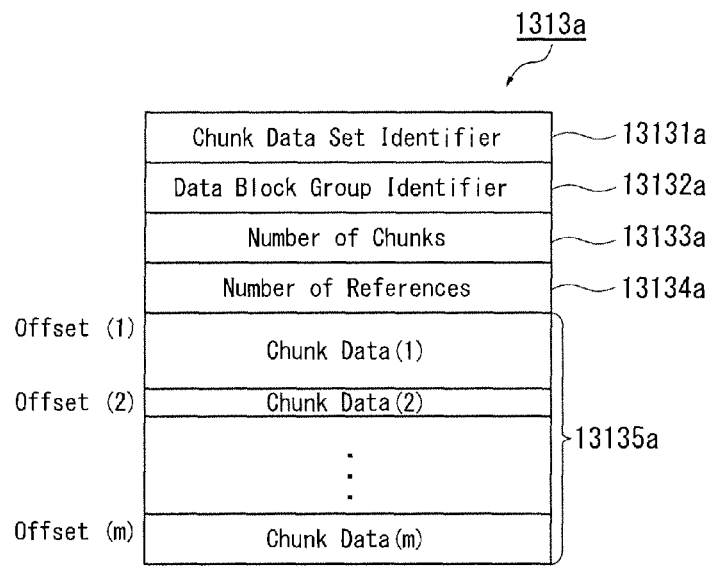
FIG. 15 is a conceptual diagram of chunk data set management information according to the second embodiment.

FIG. 15 shows a conceptual diagram of chunk data set management information 1313*a* wherein one piece of the chunk data set management information 1313*a* exists for each chunk data set and is used to collectively manage chunks of data blocks having a relationship of valid deduplication.

The chunk data set management information 1313*a* has a table structure constituted from a chunk data set identifier field 13131*a*, a data block group identifier field 13132*a*, a number-of-chunks field 13133*a*, a number-of-references field 13134*a*, and chunk data fields 13135*a*.

The chunk data set identifier field 13131*a* stores an identifier of the relevant chunk data set. Furthermore, the data block group identifier field 13132*a* stores an identifier of a group when data blocks are grouped into a group having a relationship of valid deduplication.

The number-of-chunks field 13133*a* stores the number of chunks stored in the chunk data set. Also, the number-of-references field 13134*a* stores the total number of times of references made from the data blocks to the chunks stored in the chunk data set. Furthermore, the chunk data field 13135*a* stores chunk data.

(2-2) Outline of Data Block Deletion Processing According to Second Embodiment

Figure 16:
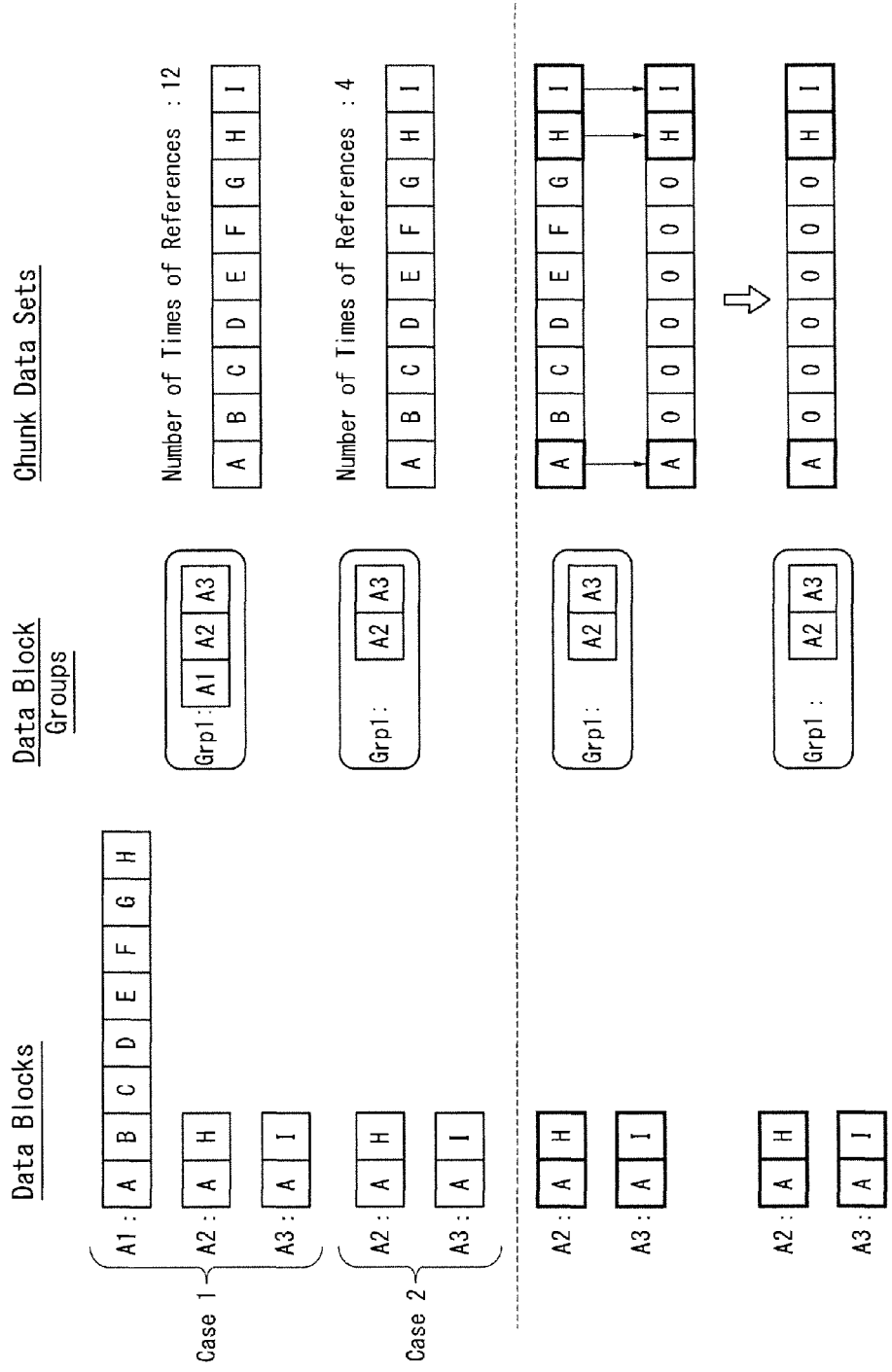
FIG. 16 is a conceptual diagram of data block deletion processing according to the second embodiment.

FIG. 16 shows the outline of data block deletion processing according to the second embodiment. In this section, a data management method performed when a data deletion request is issued from the client 11, which is a host system, to the server 12 will be explained below.

Incidentally, processing explained below is executed by cooperation of the CPU 121 and the deduplication program 1221 of the server 12. Also, processing of an upper part and processing of a lower part (the upper part and the lower part divided by a broken line) are executed asynchronously.

Firstly, two cases will be explained with respect to the upper part.

In Case 1, it is shown that the data block A1 whose data block identifier is A1, the data block A2 whose data block identifier is A2, and the data block A3 whose data block identifier is A3 are stored. It is also shown that the data blocks A1 to A3 belong to the same data block group Grp1 based on the assigned data block group judgment chunks. Furthermore, it is shown that a chunk data set is composed of the chunks A to I obtained by gathering a plurality of chunks constituting the data blocks A1 to A3.

In case 1, the number of times of references (a total number of times of reference made from the data blocks A1 to A3 to the chunks A to I constituting the chunk data set) is 12 times.

In case 2, it is shown that when the data block A1 whose data block identifier is A1, the data block A2 whose data block identifier is A2, and the data block A3 whose data block identifier is A3 are stored, the data block A1 is deleted in response to a deletion request from the client 11. In this case, the data block A1 is deleted from the data block group Grp1. Then, the chunk data set remains to be composed of the chunks A to I, which are obtained by gathering the plurality of chunks constituting the data blocks A1 to A3, for a while in consideration of an increase of I/Os caused by the deletion processing.

In case 2, the number of times of references (a total number of times of reference made from the data blocks A2 and A3 to the chunks A to I constituting the chunk data set) is 4 times. For example, if the predetermined threshold value is 10 times in case 2, the actual number of times of references (4 times) is less than the threshold value (10 times). As a result, if a deletion request to delete the data block A1 is made by the client 11, the chunk data set becomes the target of garbage collection.

Next, the lower part when the data block is deleted in case 2 of the upper part will be explained. It should be noted that the processing of the upper part and the processing of the lower part are executed asynchronously. The increase of response time for the deletion request from the client 11 can be inhibited by having the above-described processing executed asynchronous.

The lower part shows processing after the data block A1 is deleted in response to the deletion request from the client 11 and it is shown that only the data blocks A2 and A3 are stored. Furthermore, the chunk data set is composed of the plurality of chunks constituting the data blocks A2 and A3 and the plurality of chunks constituting the data block A1 excluding the chunks constituting the data blocks A2 and A3 are managed by resetting them to chunks configured by filling them with 0.

(2-3) Deduplication Processing According to Second Embodiment

Figure 17:
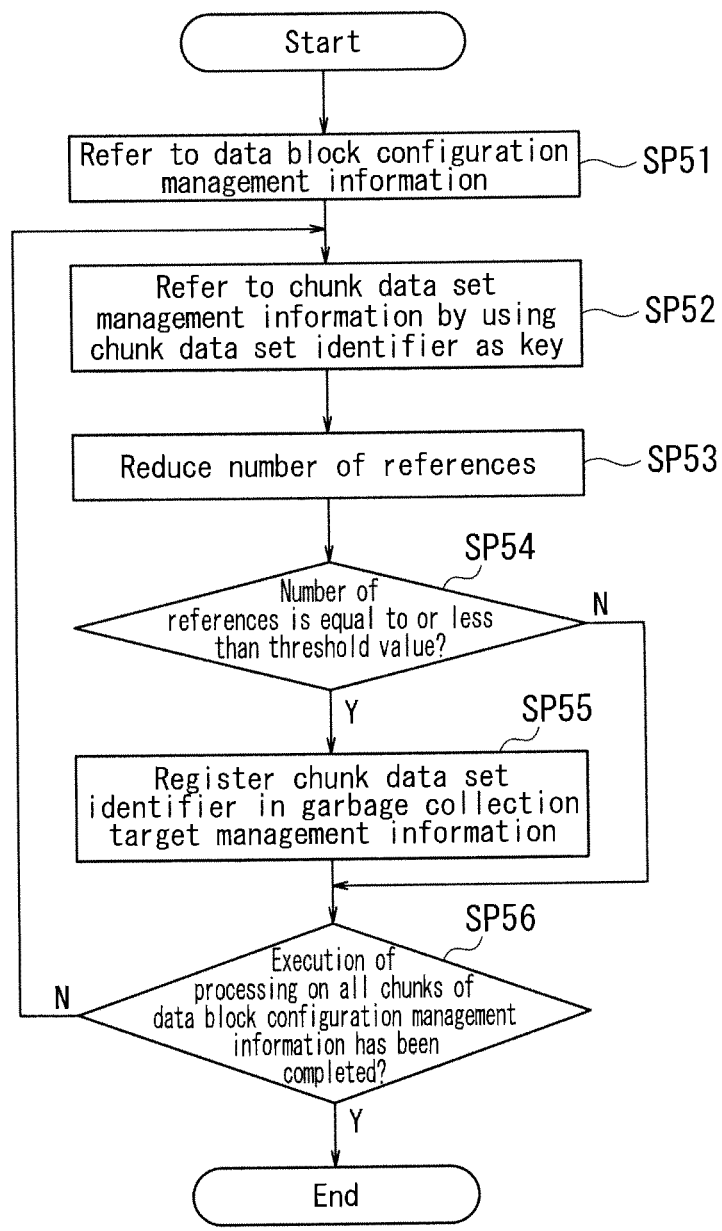
FIG. 17 is a flowchart illustrating data block deletion processing according to the second embodiment.

FIG. 17 shows a processing sequence for data block deletion processing. This data block deletion processing is processing executed when deleting a data block in response to a data block deletion request from the client 11. Furthermore, this data block deletion processing is executed by cooperation of the CPU 121 and the deduplication program 1221 of the server 12. For convenience of explanation, the deduplication program will be referred to as a processing subject in the following explanation.

The deduplication program 1221 refers to the data block configuration management information 1312a stored in the large-capacity storage system 13 (SP51).

Next, the deduplication program 1221 further uses the chunk data set identifier, which is stored in the data block configuration management information 1312a, as a key and refers to the chunk data set management information 1313a corresponding to this chunk data set identifier (SP52).

Then, the deduplication program 1221 reduces the number of references of the chunk data set management information 1313a (SP53).

Subsequently, the deduplication program 1221 judges whether or not the number of references after the reduction is equal to or less than a predetermined threshold value (SP54).

If the deduplication program 1221 obtains a negative judgment result in this step, it proceeds to step SP56.

On the other hand, if the deduplication program 1221 obtains an affirmative judgment result in step SP54, it registers the chunk data set identifier in the garbage collection target management information 1316 (SP55).

Next, the deduplication program 1221 judges whether the execution of the above-described processing on all the chunks stored in the data block configuration management information 1312a has been completed or not (SP56).

If the deduplication program 1221 obtains a negative judgment result in this step, it proceeds to step SP52 and executes the above-described processing on all the chunks stored in the chunk data set management information 1313a.

On the other hand, if the deduplication program 1221 obtains an affirmative judgment result in step SP56, it terminates this data block deletion processing.

Figure 18:
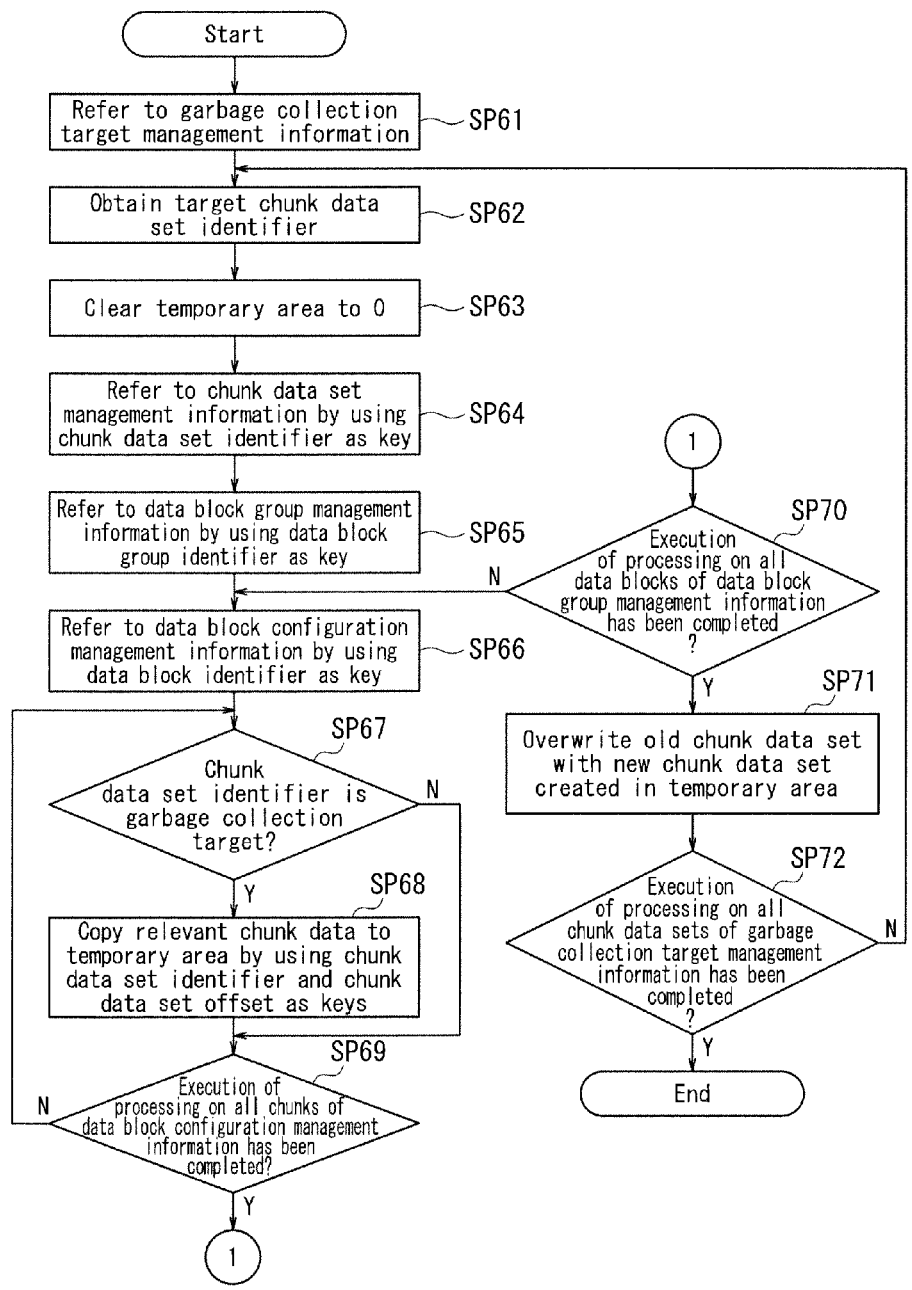
FIG. 18 is a flowchart illustrating garbage collection processing according to the second embodiment.

FIG. 18 shows a processing sequence for garbage collection processing. This garbage collection processing is processing executed asynchronously with the data block deletion processing shown in FIG. 17 and is processing executed when a data block is deleted in response to a data block deletion request from the client 11. Furthermore, this garbage collection processing is executed by cooperation of the CPU 121 and the deduplication program 1221 of the server 12. For convenience of explanation, the deduplication program will be referred to as a processing subject in the following explanation.

The deduplication program 1221 refers to the garbage collection target management information 1316 (SP61).

Next, the deduplication program 1221 obtains a chunk data set identifier of a garbage collection target from the garbage collection target management information 1316 (SP62).

Then, the deduplication program 1221 clears a temporary area to 0 (SP63).

Subsequently, the deduplication program 1221 refers to the corresponding chunk data set management information 1313a by using the obtained chunk data set identifier of the garbage collection target as a key (SP64).

Next, the deduplication program 1221 refers to the corresponding data block group management information 1313 by using the data block group identifier of the chunk data set management information 1313a as a key (SP65).

Then, the deduplication program 1221 refers to the corresponding data block configuration management information 1312a by using the data block identifier of the data block group management information 1313 as a key (SP66).

The deduplication program 1221 judges whether or not the chunk data set identifier of the garbage collection target exists in the data block configuration management information 1312a (SP67).

If the deduplication program 1221 obtains a negative judgment result in this step, it proceeds to step SP69.

On the other hand, if the deduplication program 1221 obtains an affirmative judgment result in step SP67, it uses the chunk data set identifier and the chunk data set offset of the garbage collection target in the data block configuration management information 1312a as keys and copies chunk data corresponding to these identifiers to the temporary area (SP68).

The deduplication program 1221 judges whether the execution of the above-described processing on all the chunks of the data block configuration management information 1312a has been completed or not (SP69).

If the deduplication program 1221 obtains a negative judgment result in this step, it proceeds to step SP67 and executes the above-described processing again.

On the other hand, if the deduplication program 1221 obtains an affirmative judgment result in step SP69, it judges whether the execution of the above-described processing on all the data blocks in the data block group management information 1313 has been completed or not (SP70).

If the deduplication program 1221 obtains a negative judgment result in this step, it proceeds to step SP66 and executes the above-described processing again.

On the other hand, if the deduplication program 1221 obtains an affirmative judgment result in step SP70, it gathers a plurality of chunks, which have been copied to the temporary area, to create a new chunk data set and overwrites the existing chunk data set with this created new chunk data set (SP71).

The deduplication program 1221 judges whether the execution of the above-described processing on all the chunk data sets stored in the garbage collection target management information 1316 has been completed or not (SP72).

If the deduplication program 1221 obtains a negative judgment result in this step, it proceeds to step SP62 and executes the above-described processing again.

On the other hand, if the deduplication program 1221 obtains an affirmative judgment result in step SP72, it terminates this garbage collection processing.

(2-4) Advantageous Effects of Second Embodiment

If the data management system 1 and the data management method according to the second embodiment are used as described above, an invalid chunk(s) will be filled with 0 after deduplication by the deduplication processing, thereby making it possible to compress and store chunk data sets by means of a general data compression technique and reduce consumption of storage areas by the invalid chunk(s) without changing the position of each chunk in a chunk data set.

(3) Other Embodiments

In the aforementioned embodiments, the data management system 1 is configured by including a plurality of clients 11, the server 12, and the large-capacity storage system 13. However, the invention is not limited to this example and, for example, the data management system 1 may be configured by including at least one client 11, the server 12, and the large-capacity storage system 13.

Furthermore, in the aforementioned embodiments, the deduplication processing is started as triggered by reception of a backup instruction from the client 11. However, the invention is not limited to this example and, for example, the deduplication processing may be started as triggered by periodical timing such as every week or every month.

REFERENCE SIGNS LIST

1 Data management system
11 Client
12 Server
121 CPU
122 Memory
1221 Deduplication program
13 Large-capacity storage system
131 HD
1312 Data block configuration management information
1313 Data block group management information
1314 Chunk data set index management information
1315 Chunk data set management information
1316 Garbage collection target management information

The invention claimed is:

1. A data management system comprising:
a server for writing and reading data blocks in response to a request from a host system and managing storage and retainment of the data blocks; and
a storage system for storing and retaining management information for storing and managing the data blocks in response to a request from the server;
wherein when the server stores and manages the data blocks in the storage system based on the management information stored and retained in the storage system,
the server manages the data blocks by dividing each data block into a plurality of chunks, extracting any chunk as a judgment chunk from the plurality of chunks obtained by dividing the data blocks, and grouping the data blocks based on the extracted judgment chunk;
the server executes deduplication processing for eliminating mutually duplicate chunks on a plurality of data blocks belonging to the same group, gathers a plurality of chunks belonging to the same group after the deduplication, and manages them as a chunk data set;
if a data block deletion request is issued from the host system, the server judges, based on the number of times of references of a chunk data set corresponding to a group of the data block for which the deletion request was made, whether or not the chunk data set should be a target of garbage collection; and
if the chunk data set is determined to be the target of garbage collection, the server copies only chunks of the data blocks, which are not deleted, among the plurality of chunks constituting the chunk data set to a temporary area at some timing, creates a new chunk data set by gathering a plurality of chunks composed of only the chunks copied to the temporary area, and manages the created new chunk data set by replacing the existing chunk data set with the created new chunk data set.

2. The data management system according to claim 1, wherein the management information stored and retained by the storage system is: data block configuration management information for managing storage locations of chunks constituting data blocks; data block group management information for managing groups of data blocks having a relationship of valid deduplication; chunk data set index management information for managing chunks stored in chunk data sets; chunk data set management information for collectively managing chunks of data blocks having a relationship of valid deduplication; and garbage collection target management information for managing a chunk data set which has become a garbage collection target.

3. The data management system according to claim 1, wherein when grouping the data blocks, the server groups and manages the data blocks by dividing each data block into a plurality of chunks, extracting any chunk as a judgment chunk from the plurality of chunks obtained by dividing the data blocks, and makes data blocks, from which the same judgment chunk as the extracted judgment chunk is extracted, belong to the same group.

4. The data management system according to claim 1, wherein if a data block deletion request is issued from the host system, the server refers to the number of times of references of a chunk data set corresponding to a group of the data block for which the deletion request was made; and if the number of times of references is equal to or more than a predetermined threshold value, the server does not determine the chunk data set to be the target of garbage collection; and if the number of times of references is less than the predetermined threshold value, the server determines the chunk data set to be the target of garbage collection.

5. The data management system according to claim 1, wherein the server asynchronously executes processing for deleting the data block, for which the deletion request was made, and processing for managing the new chunk data set by replacing the existing chunk data set with the new chunk data set.

6. The data management system according to claim 1, wherein when the new chunk data set is created and if locations of chunks stored in the new chunk data set are different from locations of chunks stored in the existing chunk data set, the server manages the new chunk data set by using chunk data set index management information for managing identifiers and storage locations of the chunks in the new chunk data set.

7. The data management system according to claim 1, wherein when the new chunk data set is created and if locations of chunks stored in the new chunk data set are different from locations of chunks stored in the existing chunk data set, the server manages the new chunk data set by filling a deleted chunk, among the chunks stored in the new chunk data set, with 0.

8. A data management method comprising:
a first step executed by a server writing and reading data blocks in response to a request from a host system and managing storage and retainment of the data blocks; and
a second step executed by a storage system storing and retaining management information for storing and managing the data blocks in response to a request from the server;
wherein in the first step when managing the data blocks stored and retained in the storage system based on the management information stored and retained in the storage system,
the server manages the data blocks by dividing each data block into a plurality of chunks, extracting any chunk as a judgment chunk from the plurality of chunks obtained by dividing the data blocks, and grouping the data blocks based on the extracted judgment chunk;
the server executes deduplication processing for eliminating mutually duplicate chunks on a plurality of data blocks belonging to the same group, gathers a plurality of chunks belonging to the same group after the deduplication, and manages them as a chunk data set;
if a data block deletion request is issued from the host system, the server judges, based on the number of times of references of a chunk data set corresponding to a group of the data block for which the deletion request was made, whether or not the chunk data set should be a target of garbage collection; and
if the chunk data set is determined to be the target of garbage collection, the server copies only chunks of the data blocks, which are not deleted, among the plurality of chunks constituting the chunk data set to a temporary area at some timing, creates a new chunk data set by gathering a plurality of chunks composed of only the chunks copied to the temporary area, and manages the created new chunk data set by replacing the existing chunk data set with the created new chunk data set.

9. The data management method according to claim 8, wherein the management information stored and retained by the storage system is: data block configuration management information for managing storage locations of chunks constituting data blocks; data block group management information for managing groups of data blocks having a relationship of valid deduplication; chunk data set index management information for managing chunks stored in chunk data sets; chunk data set management information for collectively managing chunks of data blocks having a relationship of valid deduplication; and garbage collection target management information for managing a chunk data set which has become a garbage collection target.

10. The data management method according to claim 8, wherein in the first step, when grouping the data blocks, the server groups and manages the data blocks by dividing each data block into a plurality of chunks, extracting any chunk as a judgment chunk from the plurality of chunks obtained by dividing the data blocks, and makes data blocks, from which the same judgment chunk as the extracted judgment chunk is extracted, belong to the same group.

11. The data management method according to claim 8, wherein in the first step, if a data block deletion request is issued from the host system, the server refers to the number of times of references of a chunk data set corresponding to a group of the data block for which the deletion request was made; and if the number of times of references is equal to or more than a predetermined threshold value, the server does not determine the chunk data set to be the target of garbage collection; and if the number of times of references is less than the predetermined threshold value, the server determines the chunk data set to be the target of garbage collection.

12. The data management method according to claim 8, wherein in the first step, the server asynchronously executes processing for deleting the data block, for which the deletion request was made, and processing for managing the new chunk data set by replacing the existing chunk data set with the new chunk data set.

13. The data management method according to claim 8, wherein in the first step, when the new chunk data set is created and if locations of chunks stored in the new chunk data set are different from locations of chunks stored in the existing chunk data set, the server manages the new chunk data set by using chunk data set index management information for managing identifiers and storage locations of the chunks in the new chunk data set.

14. The data management method according to claim 8, wherein in the first step, when the new chunk data set is created and if locations of chunks stored in the new chunk data set are different from locations of chunks stored in the existing chunk data set, the server manages the new chunk data set by filling a deleted chunk, among the chunks stored in the new chunk data set, with 0.

* * * * *